June 28, 1955 W. R. DRESSER 2,711,668
CONTROL FOR SYNCHRONIZING MOTION PICTURE PROJECTORS
Filed Nov. 19, 1952 3 Sheets-Sheet 1

INVENTOR.
Willis Robert Dresser
BY Emery, Varney,
Whittemore & Dix
ATTORNEYS

June 28, 1955

W. R. DRESSER 2,711,668

CONTROL FOR SYNCHRONIZING MOTION PICTURE PROJECTORS

Filed Nov. 19, 1952

3 Sheets-Sheet 2

INVENTOR.
Willis Robert Dresser,
BY
Emery, Varney,
Whittemore & Dix.
ATTORNEYS

June 28, 1955  W. R. DRESSER  2,711,668
CONTROL FOR SYNCHRONIZING MOTION PICTURE PROJECTORS
Filed Nov. 19, 1952  3 Sheets-Sheet 3

INVENTOR.
Willis Robert Dresser
BY Emery, Varney,
Whittemore & Dix
ATTORNEYS

United States Patent Office 2,711,668
Patented June 28, 1955

2,711,668

CONTROL FOR SYNCHRONIZING MOTION PICTURE PROJECTORS

Willis Robert Dresser, Long Hill, Conn., assignor to The Vitarama Corporation, Huntington, N. Y., a corporation of New York Application November 19, 1952, Serial No. 321,329

10 Claims. (Cl. 88—16.2)

This invention relates to control means for synchronizing the operation of film strip apparatus such as moving-picture projectors, or cameras, or sound-recording or reproducing apparatus that uses a film strip. The invention relates more especially to the synchronizing of the operation of a sound reproducer and a plurality of motion-picture projectors that direct contiguous images on a common screen to produce a mosaic image.

One object of the invention is to provide improved control means for establishing synchronism of different units of film strip apparatus and for returning them to synchronous relation if that relation is disturbed, as by the slower or faster starting of one motor or a slower or faster running speed of the motor of one unit.

Another object is to provide control means of the character indicated with the additional feature whereby the film of one or more units of the apparatus can be advanced or retreated for a selected length of strip, while the apparatus is operating, and will then be maintained in synchronism with the advance or retreat as a permanent adjustment of the film position. This feature can be used to correct editing or splicing errors with moving pictures and it is especially valuable in the case of mosaic images where an error of several image frames is enough to cause mismatching at the zone where adjacent images come together.

Other objects, features and advantages of the invention will appear or be pointed out as the description proceeds.

Figure 1:
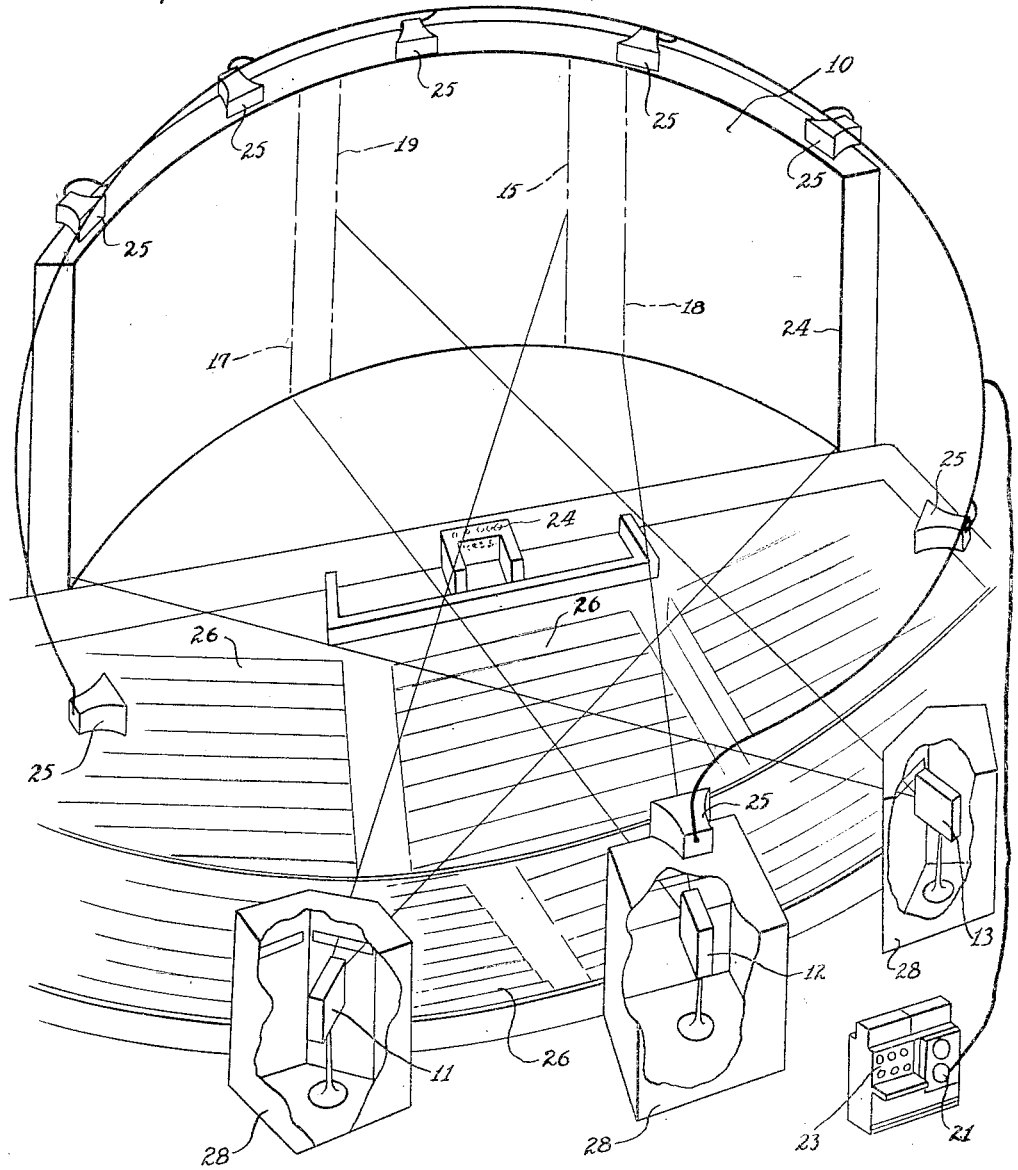
Figure 2:
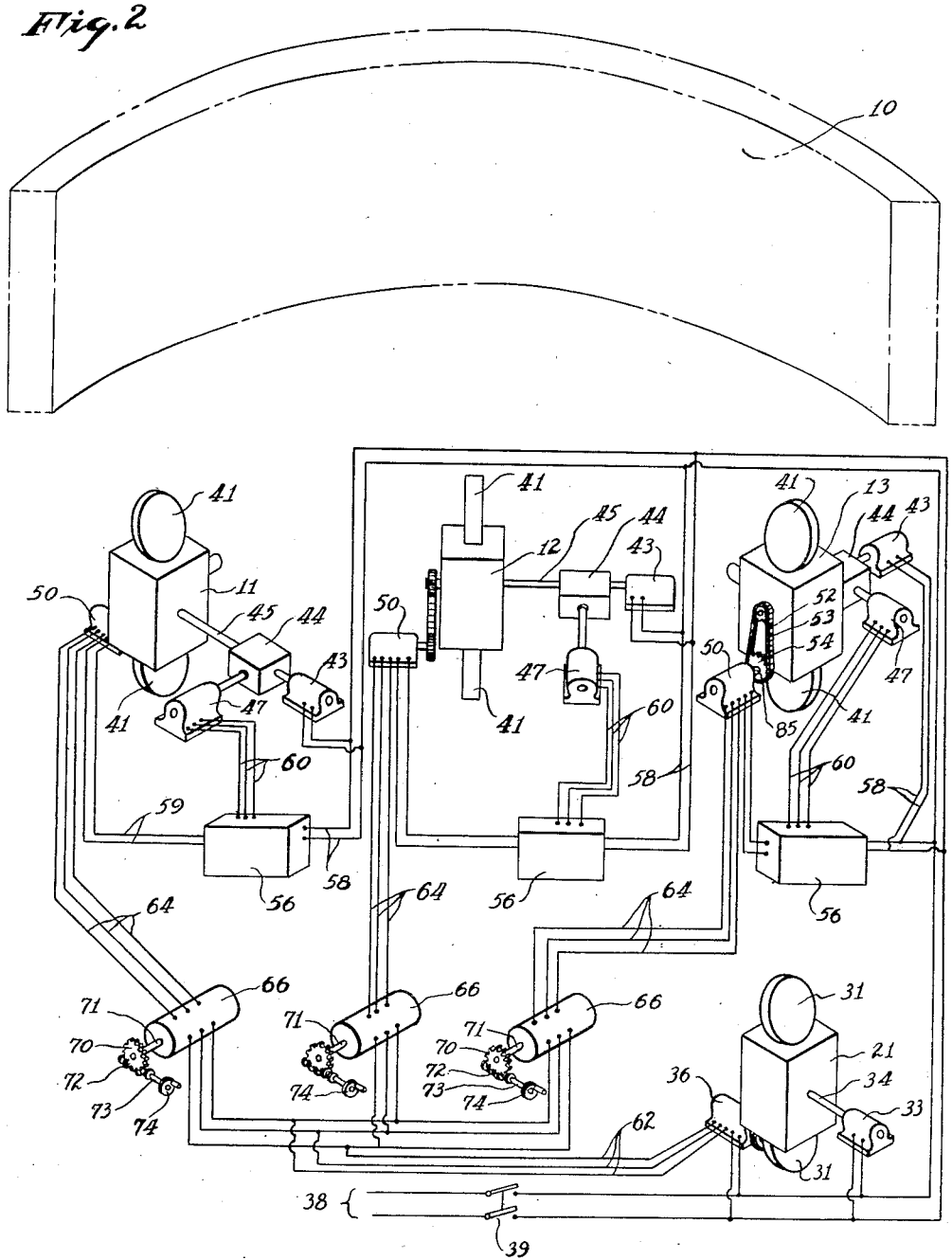
Figure 3:
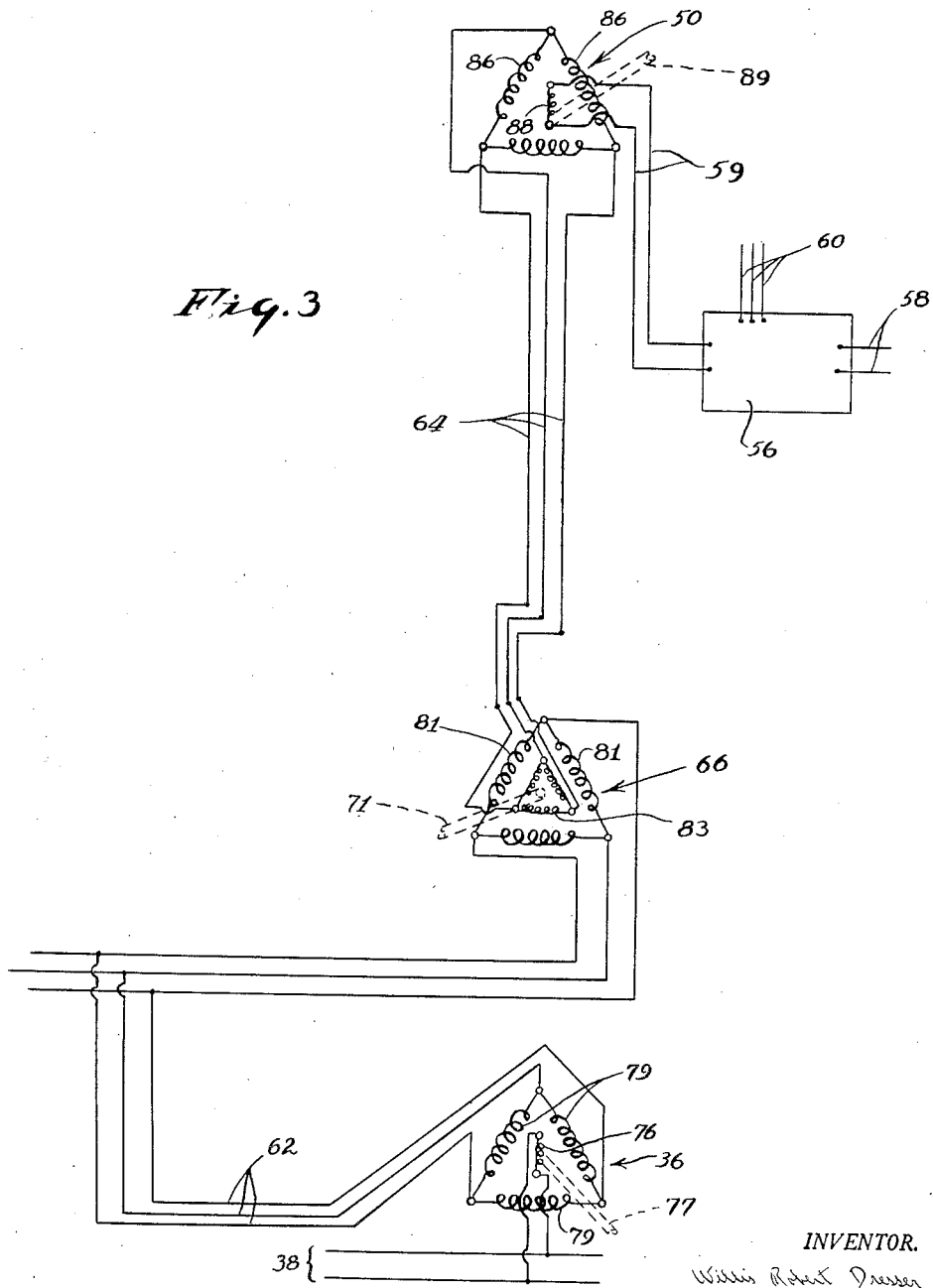

In the drawing, forming a part hereof, in which like reference characters indicate corresponding parts in all the views, Figure 1 is a diagrammatic, perspective view showing a mosaic image projection system to which the invention is applied;

Figure 2 is a diagrammatic view of the control apparatus for the projection system shown in Figure 1; and Figure 3 is a wiring diagram showing the way in which the synchro differential is connected in the circuit between the synchro generator and a synchro transformer.

Figure 1 shows a screen 10 on which a mosaic image is projected by a plurality of separate projection devices 11, 12 and 13. The projector 11 illuminates the screen 10 from a line 15 to the right-hand edge of the screen. The middle projector 12 illuminates the screen between the lines 17 and 18, while the third projector 13 illuminates the screen 10 between the line 19 and the left-hand edge of the screen.

Images on the screen overlap between the lines 15 and 18 and between the lines 17 and 19 in order to avoid the necessity of critical match lines. The overlapping zone of the contiguous edges of the image are vignetted in opposite directions so that the sum total of illumination intensity is substantially equal at all points across the overlapping zones.

Sound which accompanies the mosaic picture on the screen 10, and which is co-ordinated with the action, comes from a sound reproducer 21 which preferably uses a film strip having a plurality of parallel sound tracks thereon. The projectors 11, 12 and 13 use a motion-picture film, and the expression "film strip," as used herein, designates a flexible strip having either photographic characters thereon or other characters such as magnetized metal particles that may be used for sound recording and reproduction.

The sound signals from the sound reproducer 21 are controlled in suitable circuits from control apparatus 23 that supplies signals through a multi-conductor-cable to different speakers 25 located at various places with respect to the screen for stereophonic sound effects, which form no part of the present invention.

The control apparatus 23 is preferably operated by remote control from a station 24 located in the theater in front of the screen where the attendant can watch the picture and listen to the sound from the speakers, and make whatever adjustments are necessary in order to obtain best results for the audience located in the theater seats which are designated by reference characters 26.

The projectors 11, 12 and 13 are preferably synchronized with each other by synchronizing them with the sound reproducer 21 which serves as a master control. These projectors are located in separate projection booths 28 because they have to be widely spaced from one another in order to obtain light beams which are substantially normal to the center of the screen area which the respective projectors illuminate. The manually-operated control means for adjusting the synchronizing control is preferably located at the control station 24 in front of the screen 10.

Figure 2 shows a wiring diagram of the control apparatus. The sound reproducer 21 has film strip reels located in housings 31 and this sound reproducer has film-moving mechanism, of any conventional design, driven by a motor 33 through a power shaft 34.

A synchro generator 36 is connected with a film-moving mechanism and is driven by power supplied by the motor 33. The synchro generator 36 may be connected to rotate at the same speed as the motor 33, but a wider range of correction can be obtained from the apparatus if the synchro-generator 36 is connected with the motor 33 through suitable speed-reduction mechanism. The motor 33 and the synchro generator 36 are supplied with alternating current from a power line 38 commanded by a switch 39.

The projector 11 has film-reel housings 41 and has film-moving mechanism, of any desired design, driven from a motor 43 through differential gearing 44 and a power shaft 45. A servomotor 47 is connected to the differential 44 in position to rotate the ring gear of the differential, or the structure that is the equivalent of the ring gear, so as to add or subtract revolutions, or fractions of a revolution, to the motion imparted to the shaft 45 by the motor 43.

The projector 12 is similarly driven by a motor 43 through differential gearing 44 and a drive shaft 45. The corresponding driving motors, differential gearing and servomotors for the projectors 11, 12 and 13 are indicated by the same reference characters. The differential gearing 44 is irreversible, that is, it can be rotated differentially by the driving shaft of servomotor 47 but servomotor 47 cannot be rotated by shaft 45.

Each of the projectors 11, 12 and 13 has a synchro-control transformer 50 connected to it and driven from the film-moving mechanism of the projector. Thus the synchro-control transformer 50 of each projector 11, 12 and 13 operates at a speed which is co-ordinated with the speed of the film-moving mechanism of that projector.

The synchro-control transformer 50 is preferably driven at a speed slower than that of the motor 43; and in the illustrated construction the motion transmitting connection between the synchro-control transformer 50 and each of the projectors is a chain-and-sprocket connection. This construction is best shown with the projector 13 which has a smaller sprocket 52 driving a chain 53 which passes around a driven sprocket 54 on the armature shaft of the synchro-control transformer 50. This same driving connection is used also for the synchro generator 36 of the sound reproducer 21.

Each synchro-control transformer 50 is connected with its servomotor 47 through a circuit which includes a servo amplifier 56. This servo amplifier is connected with a power supply by conductors 58; and it is connected with the synchro-control transformer 50 by conductors 59. The connections between the servo amplifier 56 and the servomotor 47 are represented by the reference character 60. The servo amplifier is direction and phase-sensed, and the construction of such amplifiers is well understood in the art, and an explanation of its internal construction is not necessary for a complete understanding of this invention.

The synchro generator 36 has a three-wire connection 62 for supplying power to the synchro-control transformers 50. There is a separate branch line 64 between each of the control transformers and the connection 62 from the synchro generator 36. A synchro differential 66 is preferably placed in each of the branch lines 64. In ordinary operation the rotor of each synchro differential is stationary, but there is a worm wheel 70 on the shaft 71 of each of the synchro differentials 66. This worm wheel 70 is rotated by a worm 72 on a shaft 73 with a hand-wheel 74. Rotation of the hand-wheel 74 in one direction turns the rotor shaft 71 clockwise and rotation of the hand-wheel 74 in the opposite direction turns the rotor shaft 71 counterclockwise.

In order to make it possible for an attendant to control the synchronization of all of the projectors 11, 12 and 13, with respect to the sound reproducer 21 and with respect to each other, all of the hand-wheels 74 are located at a common control station from which the attendant can watch the screen. This common control station is the station 24 shown in Figure 1.

Referring again to Figure 2, the control apparatus illustrated, with or without the synchro differentials 66, will maintain the projectors 11, 12 and 13 in synchronism with the sound reproducer 21, and with each other. The sound reproducer 21 is the master control since the synchro generator is driven by the sound reproducer. The connection of the synchro generator 36 to each synchro-control transformer 50 causes the synchro-control transformers to supply signal current to the amplifiers 56 only when the synchro-control transformers 50 get out of phase with the synchro-generator. Such follow-up apparatus is well known in the art, and whenever power signals are supplied from one of the synchro-control transformers 50 to its amplifier 56, the amplifier supplies power to the servomotor to rotate the servomotor 47 and its connected differential gearing 44 in a direction to bring the synchro-control transformer 50 back into phase with the synchro-control generator 36.

Thus the projectors 11, 12 and 13 are made to operate at a speed which is exactly co-ordinated with that of the sound reproducer 21; and if any of the projectors 11, 12 and 13 starts more quickly or more slowly than the sound reproducer 21, then the control apparatus will add or subtract the correct number of revolutions as dictated by the synchro generator 36.

It will be evident, however, that this control mechanism which causes the projectors to remain in synchronism and to make the same number of revolutions in a given period of time, provides no way by which to correct for editing and splicing errors which may occur in a film. In the case of mosaic image projection, an editing or splicing error of as few as two or three image frames may be sufficient to cause mismatching of the contiguous areas of different images on the screen.

If one film strip has two or three image frames missing at a particular place, it is desirable to counteract this shortness of the film by subtracting the corresponding number of revolutions from the drive of the film-moving mechanism of the projector using that film. This can be done by means of the synchro differentials 66. Turning of the rotor of any one of the synchro differentials 66 produces a phase difference in the signal from the synchro transformer 50 to which the adjusted synchro differential 66 is connected. Revolutions can be either added or subtracted, depending upon which way the rotor of the synchro differential 66 is turned; and the revolutions thus added or subtracted remain as a permanent adjustment in the circuit so that the synchronizing apparatus will continue to operate and maintain the synchronism of the projector as though no revolutions had been added or subtracted by the synchro differential 66.

Figure 3 is a wiring diagram illustrating the way in which the synchro differential 66 is connected in the circuit between the synchro generator 36 and the synchro transformer 50 of the projector 13.

The synchro generator 36 has a rotor 76 which is turned by a shaft 77 in timed relation with the film-moving mechanism of the sound reproducer apparatus. This rotor 76 receives power from the power line 38. The field 79 of the synchro generator 36 is connected by the three-wire connection 62 to the field 81 of the synchro differential 66. This synchro differential has a three-phase rotor 83 which assumes a different position with respect to the field 81, but the position of the rotor 83 can be changed by turning the rotor shaft 71 by the manually operated mechanism previously described.

The rotor 83 is connected to a field 86 to the synchro-control transformer 50 by conductors of the branch line 64. A rotor 88, of the synchro-control transformer 50 is rotated by a shaft 89 from the film-moving mechanism of the projector.

As long as the rotor 88 in the synchro-control transformer 50 is in phase with the rotor 76 in the synchro generator 36, no current will flow through the conductors 59 to the servo amplifier 56.

If the rotor 83 of the synchro differential 66 is turned, in one direction or the other, however, then the effect on the rotor 88 of the synchro-control transformer 50 will be the same as though the synchro-control transformer had been rotated at an incorrect speed and accumulated an error. Stated another way, the adjustment of the synchro differential 66 introduces what may be termed "artificial errors" in the circuit between the synchro generator 36 and the synchro control transformer 50. The apparatus operates to correct these errors and then continues to function as before.

If, because of some editing or splicing error, it is desirable to subtract enough revolutions to correspond to three film-frame images from the film-moving mechanism of a projector, the shaft 71 of the synchro differential 66 is turned in a direction to introduce an error corresponding to a gain of three image frames in the projector which actually has the three image frames missing from its film. The synchro-control transformer 50 thereupon sends signals to the amplifier 56 and causes an operation of the servomotor of that projector until a correction of three image frames has been made. The control apparatus continues to operate as though that projector had made the same number of revolutions as the other projectors, and the adjustment introduced by the turning of the synchro-differential rotor 83 becomes a permanent adjustment of the synchronizing control.

In the illustrated embodiment of the invention, the sound reproducer serves as the master control. Any selected projector could be used equally well as the master control; or the sound reproducer and all of the projectors can be controlled from some other machine which would serve as a "cuing machine." In any event, the synchro generator is connected with the particular machine that serves as the master control.

The preferred embodiment of the invention has been illustrated and described, but changes and modifications can be made and some features can be used without others, without departing from the invention as defined in the claims.

What is claimed is:

1. The combination with film strip apparatus comprising several separate units, of power driving mechanism for each unit including a differential through which motion is imparted to the film moving mechanism of that apparatus, a servomotor connected to the differential in position to operate the differential to change the speed of the power drive that is transmitted through the differential to the film-moving mechanism, a synchro-generator driven by one of the units of the film strip apparatus, a synchro-control transformer driven by the film-moving mechanism of each of the other units, a circuit connecting the synchro-generator with the synchro transformer of each of said other units, and a circuit connecting the synchro-control transformer of each unit with the servomotor of that unit, whereby the operation of the units is synchronized.

2. Film strip apparatus including a sound reproducer and a plurality of projectors, the sound reproducer and each projector including film strip-moving mechanism, power driving mechanism for the respective projectors and sound reproducer, differential gearing between the power driving mechanism and the film-moving mechanism of each of the projectors, a servomotor operably connected with the differential gearing of each projector, a synchro generator driven by the sound reproducer, a synchro transformer driven in timed relation with the film-moving mechanism of each of the projectors, a circuit connecting the synchro generator with each of the synchro transformers, and control connections between the synchro transformer of each projector and the servo motor of the differential gearing of that projector, whereby the operation of the projectors and sound reproducer is synchronized.

3. Control apparatus for maintaining a plurality of motion-picture projectors in synchronism with a sound reproducer and with each other, the control apparatus comprising a synchro generator driven in timed relation with the sound reproducer, a synchro-control transformer for each projector driven in timed relation with film-moving mechanism of that projector, differential gearing for each projector and through which the projector is driven from a source of power, a servomotor connected with each differential mechanism in position to operate it and change the speed of the motion that is transmitted from the power source through the differential to the projector, circuits connecting the synchro generator with each of the synchro-control transformers, and control connections between each transformer and the servomotor of the differential of that projector.

4. Film strip apparatus including a sound reproducer unit and a plurality of projector units, a separate electric motor driving film-moving mechanism of each projector unit, irreversible differential gearing between each motor and the film-moving mechanism of each of the projectors, a plurality of servomotors one for each differential for driving that differential, a synchro generator driven by the sound reproducer unit, and a synchro-control transformer driven by the film-moving mechanism of each of the projectors, whereby the operation of the units is synchronized.

5. Film strip apparatus comprising a sound reproducer unit and a plurality of projector units, each of which has mechanism for moving a film strip, a synchro generator operated by the power driving mechanism of one of the units, power driving mechanism including a separate differential associated with each of the other units and through which power is transmitted to said other units, a separate servomotor connected with each differential in position to operate the differential to change the speed of the motion transmitted through the differential to the film-moving mechanism, a synchro-control transformer driven from the film-moving mechanism of each of said other units, circuits connecting the synchro generator with each of the synchro control transformers, and control connections between the synchro-control transformer of each unit and the servomotor of that unit, said control connections including a servo amplifier having direction and phase sense, whereby the operation of the units is synchronized.

6. Film strip apparatus comprising a plurality of separate units, each of which has film-moving mechanism, power driving mechanism for each unit, a synchro generator driven by one unit which serves as a master with which the other units are to be synchronized, differential gearing between the film-moving mechanism and the power driving mechanism of each of said other units, a separate servo-motor connected with the differential gearing of each of said other units, the servomotor being connected to the differential in a relation to change the speed of the power transmitted through the differential gearing by operation of the servomotor, a separate synchro-control transformer driven by the power taken off the film-moving mechanism of that unit, a circuit connecting the synchro generator with each of the synchro transformers, other circuits connecting the synchro-control transformers of the respective units with the servomotor of that unit, and a synchro differential in the circuit.

7. Picture and sound apparatus comprising a plurality of projector units, a sound reproducer unit, mechanism in each of said units that moves a film when the unit is in operation, a separate motor connected with each of the units, a synchro generator driven by the sound reproducer unit, a differential between each of the other units and its power driving mechanism, a servomotor connected to the differential in position to operate the differential to increase or decrease the speed of motion transmitted through the differential, a synchro-control transformer driven from each of the projector units, a circuit connecting the synchro generator with each synchro control transformer and a synchro differential in the circuit between the synchro generator of the sound reproducer and the synchro-control transformers of the respective projectors, and means connecting the synchro-control transformers with the servomotors, whereby the operation of the units is synchronized.

8. Picture and sound apparatus as described in claim 7, characterized by a direction and phase-sensed amplifier unit in the circuit connecting the synchro-control transformer of each projector with the servomotor of that projector.

9. Apparatus for projecting a mosaic image on a screen with co-ordinated sound accompanying the image, said apparatus comprising a sound reproducer with a film strip having a sound record thereon, and a plurality of projectors that are located in position to project images from motion picture film on adjacent areas of the screen, a separate driving motor for the sound reproducer and each of the projectors, a synchro generator driven from the sound reproducer motor, differential gearing between each projector and the motor of that projector, a synchro-control transformer on the projector side of the differential gearing driven from each projector motor, circuits connecting the synchro generator with each of the synchro-control transformers, a separate servomotor connected with the differential of each projector in position to operate the differential to add or subtract motion to that transmitted through the differential from the motor to the projector, a circuit including a direction and phase sensed amplifier between each synchro-control transformer and the servomotor of the same projector, a synchro differential in the circuit between each of the synchro-control transformers and the synchro generator, and manually-operated mechanism for the respective synchro differentials including controls grouped together at a common station from which an attendant can watch the screen, whereby the operation of the projectors and sound reproducer is synchronized.

10. Apparatus for projecting pictures with accompanying sound, said apparatus comprising a plurality of separate motor-driven units including a number of projectors, power-driving mechanism for each unit including a differential through which motion is imparted to the operating mechanism of that unit, a servomotor connected to the differential in position to operate the differential to change the speed of the power drive that is transmitted through the differential to the operating mechanism of the unit, a synchro generator driven by one of the units which acts as a master controller, a synchro-control transformer driven by the operating mechanism of each of the other units, a circuit connecting the synchro generator with the synchro-control transformer of each of the other units, and a circuit connecting the synchro-control transformer of each unit with the servomotor of that unit, whereby the operation of the units is synchronized.

References Cited in the file of this patent

UNITED STATES PATENTS

| | | |
|---|---|---|
| 1,234,127 | Bristol | July 24, 1917 |
| 1,617,991 | Dowey | Feb. 15, 1927 |
| 2,022,902 | Thomas | Dec. 3, 1935 |
| 2,280,206 | Waller et al. | Apr. 21, 1942 |
| 2,350,727 | Collins | June 6, 1944 |